United States Patent
Lim et al.

(10) Patent No.: US 8,125,978 B2
(45) Date of Patent: Feb. 28, 2012

(54) METHOD FOR ESTABLISHING DATA TRANSMISSION PATH AND SENSOR NETWORK EMPLOYING THE SAME

(75) Inventors: Hun Lim, Seoul (KR); You-sun Kim, Seoul (KR); Chun-su Park, Seoul (KR); Sung-jea Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 11/442,387

(22) Filed: May 30, 2006

(65) Prior Publication Data

US 2007/0042711 A1 Feb. 22, 2007

(30) Foreign Application Priority Data

Aug. 19, 2005 (KR) .................. 10-2005-0076492

(51) Int. Cl.
  *H04W 4/00* (2009.01)
  *H04W 24/00* (2009.01)
  *H04L 12/28* (2006.01)
(52) U.S. Cl. ........ 370/351; 370/238; 370/331; 370/338; 370/349; 455/403; 455/456.1
(58) Field of Classification Search .......... 370/228–463; 455/403, 455, 456.1, 456.3
See application file for complete search history.

(56) References Cited

U.S. PATENT DOCUMENTS

| | | | |
|---|---|---|---|
| 6,401,027 B1* | 6/2002 | Xu et al. ................. 701/117 |
| 6,487,177 B1* | 11/2002 | Weston-Dawkes ........ 370/254 |
| 6,728,771 B2* | 4/2004 | Stumer .................... 709/227 |
| 7,295,521 B2* | 11/2007 | Choi et al. ............... 370/238 |
| 7,379,447 B2* | 5/2008 | Dunagan et al. ........ 370/350 |
| 7,440,436 B2* | 10/2008 | Cheng et al. ............ 370/338 |
| 7,477,620 B2* | 1/2009 | Kim et al. ................ 370/328 |
| 7,596,152 B2* | 9/2009 | Yarvis et al. ............. 370/503 |
| 7,653,030 B2* | 1/2010 | Arrakoski et al. ........ 370/338 |
| 7,693,049 B2* | 4/2010 | Joseph et al. ........... 370/229 |
| 2002/0027894 A1* | 3/2002 | Arrakoski et al. ........ 370/338 |
| 2004/0223463 A1* | 11/2004 | MacKiewich et al. .... 370/256 |
| 2005/0136898 A1* | 6/2005 | Shaheen et al. ......... 455/414.1 |
| 2005/0157698 A1* | 7/2005 | Park et al. ............... 370/351 |
| 2005/0232213 A1* | 10/2005 | Meier ..................... 370/338 |
| 2005/0265251 A1* | 12/2005 | Acharya et al. .......... 370/252 |
| 2006/0013154 A1* | 1/2006 | Choi et al. ............... 370/312 |
| 2006/0087992 A1* | 4/2006 | Ganesh ................... 370/310 |
| 2006/0092913 A1* | 5/2006 | Joseph et al. ........... 370/351 |
| 2006/0126524 A1* | 6/2006 | Tateson ................... 370/252 |

(Continued)

FOREIGN PATENT DOCUMENTS

KR 2006132113 A * 12/2006

*Primary Examiner* — Ayaz Sheikh
*Assistant Examiner* — Venkatesh Haliyur
(74) *Attorney, Agent, or Firm* — NSIP Law

(57) ABSTRACT

A sensor network system and method for establishing a data transmission path are is disclosed. The method for establishing a data transmission path of a sink node and the network system which includes a plurality of nodes including the sink node, includes a) requesting nodes on a previously established data transmission path to give their adjacent node information, b) receiving the adjacent node information, c) retrieving adjacent nodes as the sink node moves, and d) reestablishing the data transmission path through the result of retrieval and the adjacent node information. Since the data transmission path is reestablished without flooding, it is possible to reduce energy of the nodes. Also, the method for establishing a data transmission path can be applied to any routing protocols without additional conditions.

12 Claims, 6 Drawing Sheets

U.S. PATENT DOCUMENTS

| | | | |
|---|---|---|---|
| 2006/0153154 A1* | 7/2006 | Yoon et al. | 370/338 |
| 2006/0187017 A1* | 8/2006 | Kulesz et al. | 340/506 |
| 2006/0271661 A1* | 11/2006 | Qi et al. | 709/223 |
| 2007/0038767 A1* | 2/2007 | Miles et al. | 709/230 |
| 2007/0132846 A1* | 6/2007 | Broad et al. | 348/143 |
| 2008/0002599 A1* | 1/2008 | Yau et al. | 370/310 |

* cited by examiner

TYPE 1: CASE WHERE SINK NODE MOVES AROUND $H_N$

TYPE 2: CASE WHERE SINK NODE MOVES AROUND $NH_2$

TYPE 3: CASE WHERE SINK NODE MOVES AROUND $NH_1$

TYPE 1

TYPE 2

TYPE 3

METHOD FOR ESTABLISHING DATA TRANSMISSION PATH AND SENSOR NETWORK EMPLOYING THE SAME

CROSS-REFERENCE TO RELATED APPLICATIONS

This application claims the benefit under 35 U.S.C.§119(a) from Korean Patent Application No. 2005-76492, filed on Aug. 19, 2005, in the Korean Intellectual Property Office, the entire disclosure of which is hereby incorporated by reference.

BACKGROUND OF THE INVENTION

1. Field of the Invention

The present invention relates to a sensor network and method for establishing a data transmission path. More particularly, the present invention relates to a sensor network and method for establishing a data transmission path, which can efficiently establish the data transmission path from a data transmitter to a data receiver that is even in motion.

2. Description of the Related Art

A general mobile communication system transmits and receives data between a mobile terminal and a base station. The mobile terminal and the base station directly transmit and receive data with each other, not through any other mobile terminals/nodes.

However, a sensor network uses other nodes in order to transmit data to a sink node (data transmitter). In other words, nodes constituting the sensor network include a sink node, a source node, and a relay node depending on their functions. The sink node, which serves as a data receiver, is a destination node to which specified data are to be transmitted. The source node, which serves as a data transmitter, is an originating node of the specified data to be transmitted to the sink node. Meanwhile, the relay node means a node constituting a data transmission path from the source node to the sink node.

The source node located within a predetermined distance from the sink node directly transmits data to the sink node. However, the source node, which is not located within the predetermined distance from the sink node, does not directly transmit data to the sink node but transmits the data to the relay nodes adjacent to the sink node. This is to minimize power consumption caused by data transmission. In other words, the distance between the sink node and the source node is generally proportional to power consumption required to transmit data from the source node to the sink node.

Therefore, the source node, which is not located within a predetermined distance from the sink node, transmits data using a plurality of relay nodes so as to minimize power consumption caused by data transmission. However, the sink node is not fixed but is somewhat movable.

FIG. 1 illustrates the principle of a conventional method for establishing a data transmission path. Referring to FIG. 1, in case where the sink node moves from a first position 10 to a second position 20, a path loss occurs in an originally established path due to a movement of the sink node as shown in steps 2 and 1 respectively, and a new path is established to recover such a path loss, step 3.

However, the conventional method for establishing a data transmission path has the problem that a path is newly established when the path loss occurs due to the movement of the sink node. In other words, a problem arises in that the existing information on the data transmission path is not used in establishing a new path.

Accordingly, there is a need for an improved sensor network and method for establishing a data transmission path.

SUMMARY OF THE INVENTION

The present invention has been developed in order to solve the above drawbacks and other problems associated with the conventional arrangement. An aspect of the present invention is to provide a sensor network and method for establishing a data transmission path, which can efficiently establish the data transmission path from a data transmitter to a data receiver by using existing information on the data transmission path.

The foregoing and other objects and advantages are substantially realized by providing a sensor network and method for establishing a data transmission path of a sink node that includes a plurality of nodes including the sink node, according to the present invention, which comprises a) requesting nodes on a previously established data transmission path to give their adjacent node information, b) receiving the adjacent node information, c) retrieving adjacent nodes as the sink node moves, and d) reestablishing a data transmission path through the result of retrieval and the adjacent node information.

Preferably, the nodes on the data transmission path at the step a) are first and second nodes from the sink node.

The network and method further comprise storing the requested adjacent node information.

The step c) includes c1) broadcasting a predetermined message to the adjacent nodes, and c2) receiving information including node IDs from the adjacent nodes.

The step d) includes d1) selecting a first node from the sink node on the data transmission path.

The first node is selected among the retrieved adjacent nodes depending on priority order, and a node having a first priority order depending on the priority order is an adjacent node closest to the sink node on the previously established data transmission path among the retrieved adjacent nodes.

A node having a second priority order depending on the priority order is an adjacent node corresponding to a second node from the sink node among the retrieved adjacent nodes.

A node having a third priority order depending on the priority order is an adjacent node corresponding to the first node from the sink node among the retrieved adjacent nodes.

A predetermined weight value is accumulated depending on the priority order, and the data transmission path is wholly reestablished if the accumulated weight value exceeds a predetermined threshold value.

The accumulated predetermined weight value is initiated if the data transmission path is wholly reestablished.

The network and method further comprise receiving the adjacent node information of the nodes on the reestablished data transmission path.

The adjacent nodes are those within a distance of one hop from the nodes.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF EXEMPLARY EMBODIMENTS

Figure 1:
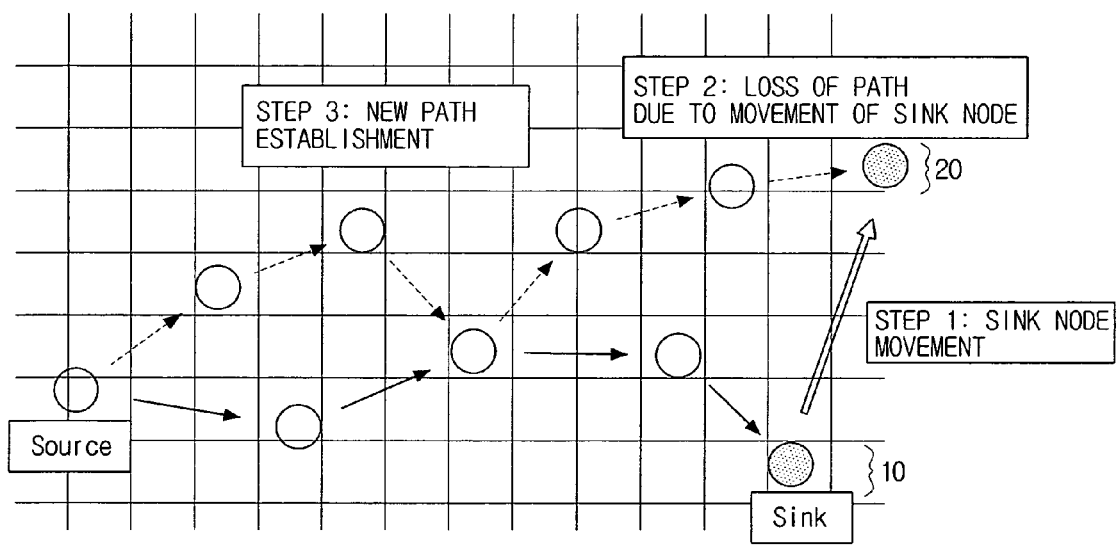
FIG. 1 is a view illustrating the principle of a conventional method for establishing a data transmission path.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
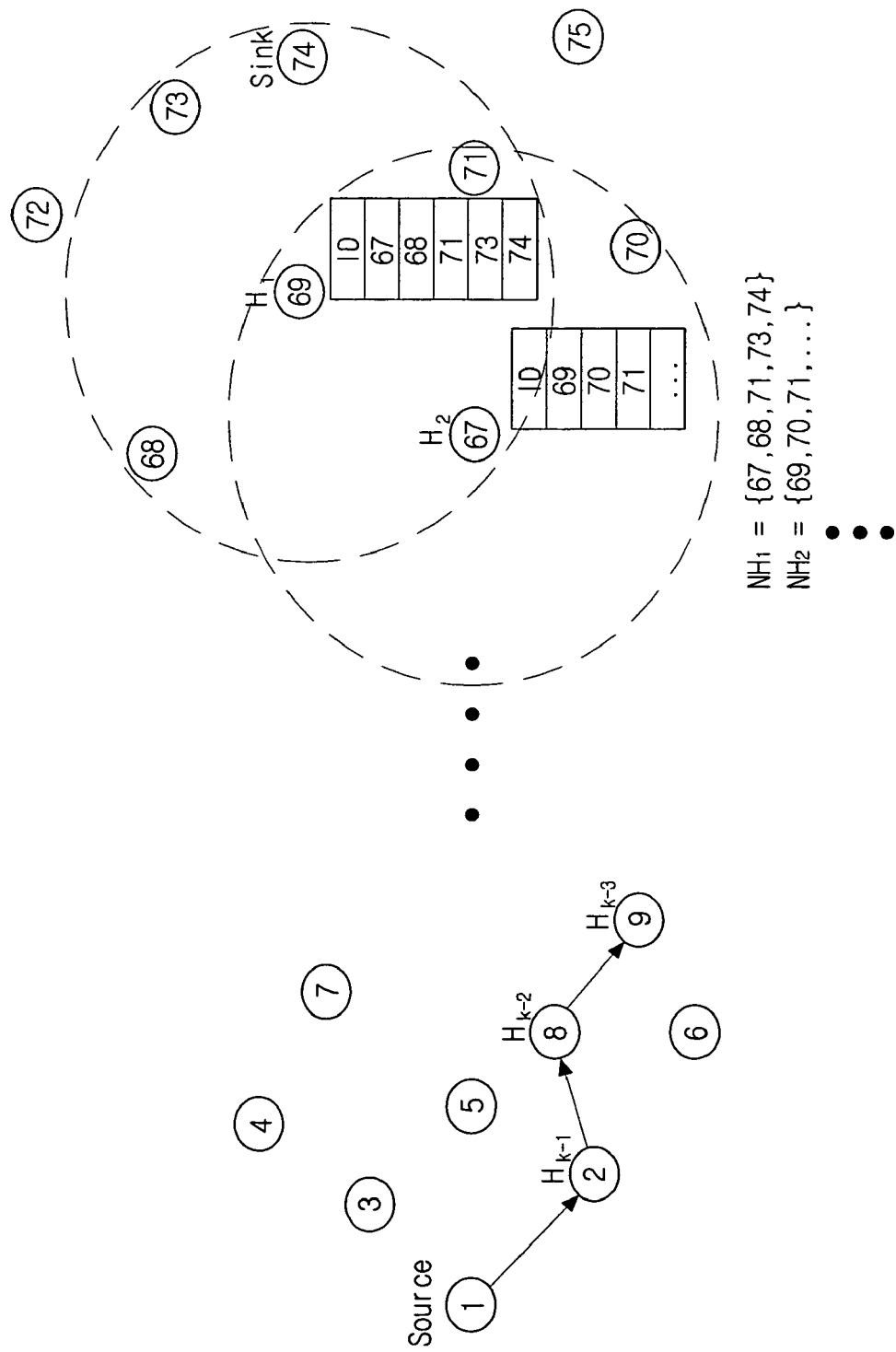
FIG. 2 is a view illustrating the structure of a sensor network to which a method for establishing a data transmission path according to an exemplary embodiment of the present invention is applied.

FIG. 2 illustrates the structure of a sensor network and a method for establishing a data transmission path according to an exemplary embodiment of the present invention is applied. A description of a sensor network for establishing a data transmission path according to an exemplary embodiment of the present invention is applied will be described as follows.

First, a data transmission path is formed between a source node (node 1) and a sink node (node 74). Data transmission is made through the data transmission path. Also, all the nodes on the network catch information on their adjacent nodes located within a distance of one hop.

For example, a node 67 stores information including node IDs of its adjacent nodes, such as node 69, node 70 and node 71, within a distance of one hop. The node 69 stores information including node IDs of its adjacent nodes, such as node 67, node 68, node 71, node 73 and node 74, within a distance of one hop.

"$H_N$" illustrating a node of FIG. 2 means a node located on a data transmission path and corresponding to the number of hop(s) "N" from the sink node 74. In other words, "$H_1$" means a first node from the sink node (node 74) on the data transmission path, and "$H_2$" means a second node from the sink node (node 74) on the data transmission path. Also, "$NH_N$" illustrating an adjacent node of FIG. 2 means a set of adjacent nodes located within a distance of one hop from "$H_N$."

Figure 3:
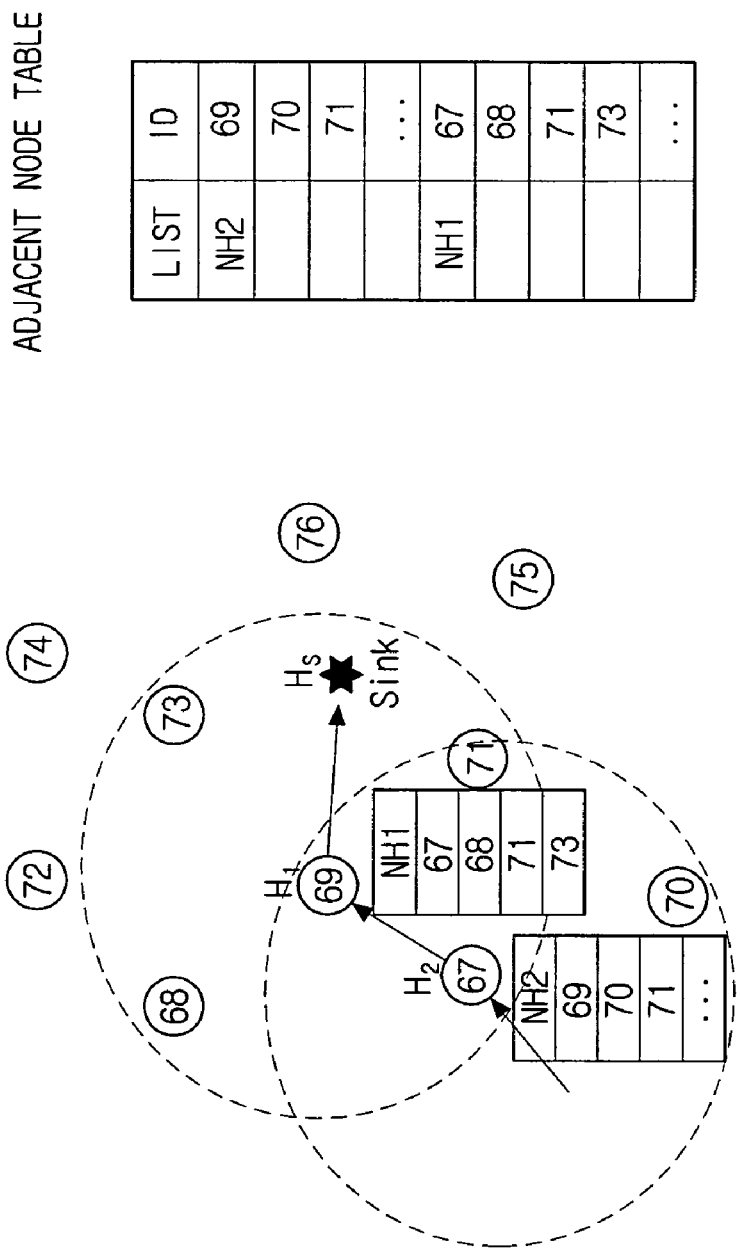
FIG. 3 is a view illustrating an adjacent node table according, to the exemplary embodiment of the present invention.

FIG. 3 illustrates an adjacent node table according to the exemplary embodiment of the present invention. In an exemplary embodiment of the present invention, if the data transmission path is established, the sink node $H_S$ transmits to "$H_1$" and "$H_2$" a message that requests the adjacent node information. The adjacent node information includes respective IDs of the adjacent nodes.

"$H_1$" and "$H_2$" that have received the request message for the adjacent node information respectively transmit their adjacent node information, in other words a set of node 67, node 68, node 71, node 73, . . . and a set of node 69, node 70, node 71, . . . , to the sink node. The sink node that has received the adjacent node information of "$H_1$" and "$H_2$" stores the adjacent node table of FIG. 3. The stored adjacent node table is used to reestablish the data transmission path if the sink node moves.

Figure 4:
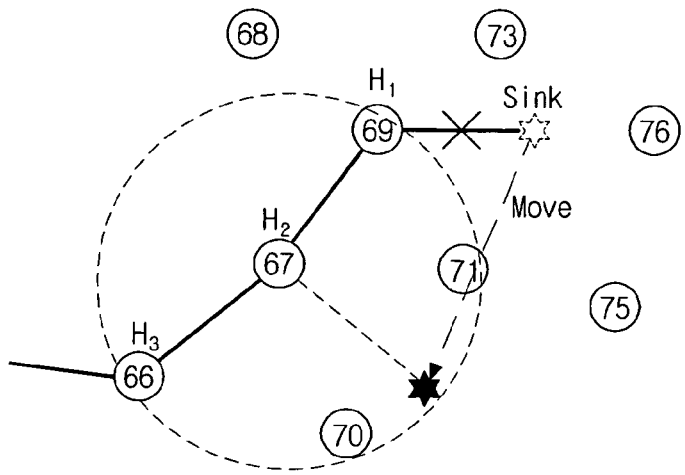
FIG. 4 is a view illustrating types of adjacent nodes during movement of a sink node according to the exemplary embodiment of the present invention.
Figure 4:
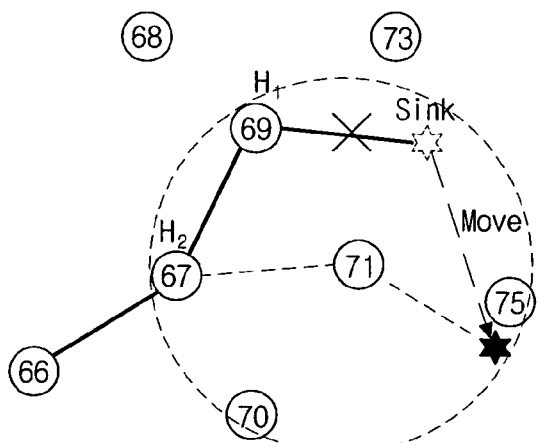
Figure 4:
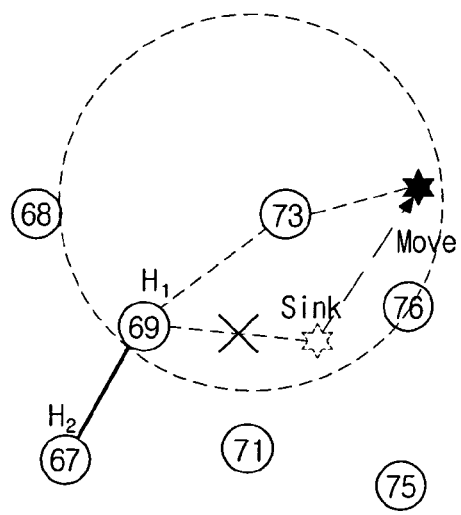

FIG. 4 illustrates types of adjacent nodes during movement of the sink node according to an exemplary embodiment of the present invention. There may be a case where the sink node moves around "$H_N$." In other words, the adjacent node of the sink node at the position where the sink node moves becomes "$H_N$" at the position before the sink node moves. In this case, if the data transmission path is reestablished, the reestablished data transmission path is reduced by "$N_{-1}$" hop(s) in comparison with the existing data transmission path. This is called "type 1."

Meanwhile, there may be another case where the sink node moves around "$NH_2$." In other words, the adjacent node of the sink node at the position where the sink node moves becomes "$NH_2$" at the position before the sink node moves. In this case, if the data transmission path is reestablished, the reestablished data transmission path is maintained at the number of hops which is the same number as the existing data transmission path. This is called "type 2."

Furthermore, the sink node may move around "$NH_1$." In other words, the adjacent node of the sink node at the position where the sink node moves becomes "$NH_1$" at the position before the sink node moves. In this case, if the data transmission path is reestablished, the reestablished data transmission path is increased by one hop in comparison with the existing data transmission path. This is called "type 3."

If the adjacent node of the sink node at the position where the sink node moves does not correspond to any one of "type 1," "type 2," and "type 3," it is called "type 4."

In an exemplary embodiment of the present invention, the adjacent nodes are retrieved after the sink node moves. In other words, if the sink node starts to move and then is disconnected from "$H_1$," a predetermined message is broadcast to the adjacent nodes. Then, the adjacent nodes transmit their information including their node IDs to the sink node.

If the adjacent node information is transmitted to the sink node, the sink node identifies through the adjacent node information whether the adjacent nodes correspond to a type among the aforementioned types. In this case, the adjacent node table is used. In other words, the sink node can compare information on the adjacent node table with adjacent node information so as to identify whether each adjacent node corresponds to "type 2" or "type 3."

In addition, the sink node can check through the corresponding adjacent node information whether each adjacent node is the existing node for the data transmission path. Thus, the sink node can identify whether each adjacent node corresponds to "type 1."

The sink node reestablishes the data transmission path through the information on the types of the adjacent nodes. Among the adjacent nodes that have transmitted the information to the sink node, "$H_1$" node on the reestablished data transmission path is determined.

To determine "$H_1$" node among the adjacent nodes, the first priority order is given to the adjacent node corresponding to "type 1", the second priority order to the adjacent node corresponding to "type 2", and the third priority order to the adjacent node corresponding to "type 3," respectively. If plural adjacent nodes corresponding to "type 1" exist, the adjacent node closest to the source node on the existing data transmission path is determined as the "$H_1$" node on the reestablished data transmission path.

If it is identified that no existing node corresponding to "type 1," "type 2," and "type 3" exists among the adjacent nodes, the adjacent nodes are determined as "type 4." In this case, the data transmission path is reestablished.

Figure 5:
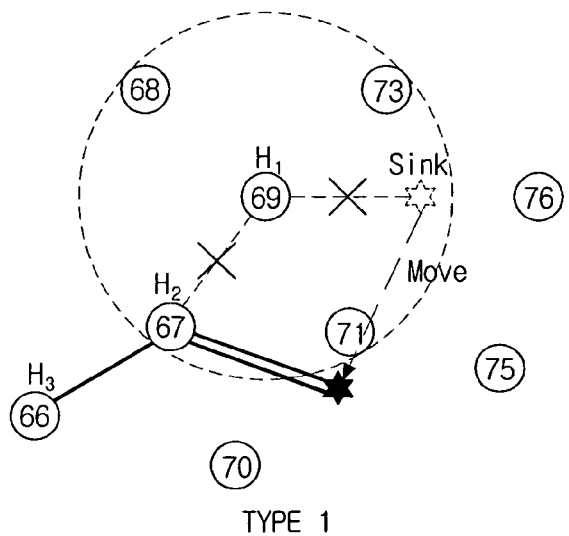
FIG. 5 is a view illustrating reestablishment types of a data transmission path according to the exemplary embodiment of the present invention.
Figure 5:
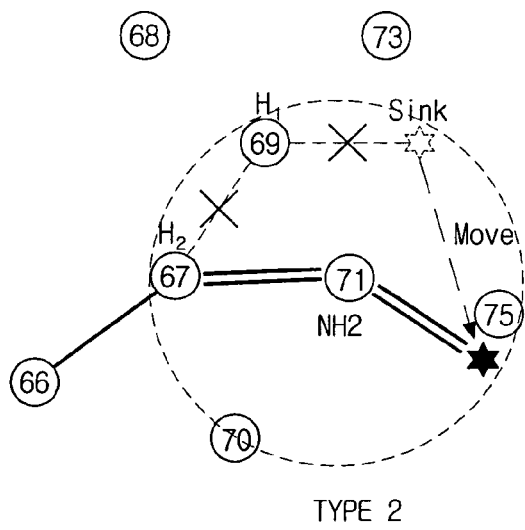
Figure 5:
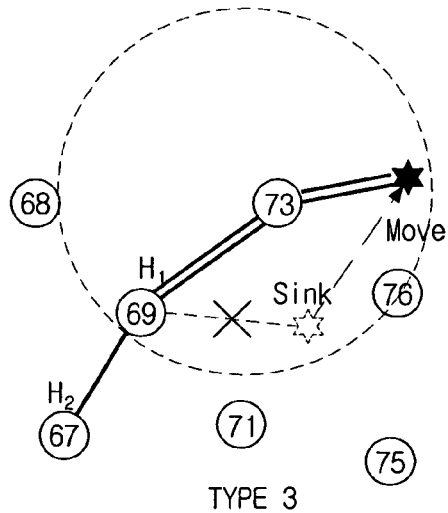

FIG. 5 illustrates reestablishment types of the data transmission path according to the exemplary embodiment of the present invention. Referring to FIG. 5, it is possible to identify reestablishment types of the data transmission path in case where the "$H_1$" node corresponds to "type 1," "type 2," and "type 3" on the reestablished data transmission path. If the "$H_1$" node corresponds to "type 1," the number of hops on the data transmission path is reduced. If the "$H_1$" node corresponds to "type 2," the number of hops on the data transmission path is maintained as it is. If the "$H_1$" node corresponds to "type 3," the number of hops on the data transmission path is increased by "1."

In case where reestablishment of the data transmission path is repeated as the sink node continues to move, complexity on the network may increase. This is because the method for establishing a data transmission path according to the exemplary embodiment of the present invention is a partial path reestablishment algorithm.

Therefore, in an exemplary embodiment of the present invention, a weight value W is preferably set depending on the aforementioned types whenever reestablishment of the data transmission path is implemented, so that complexity on the network is maintained within a certain range. In this case, the weight value W is accumulated. As a result, if a weight accumulated value P exceeds a predetermined threshold value T due to repeated reestablishment of the data transmission path, "type 4" is used to reestablish the whole data transmission path. At this time, the accumulated weight value is initiated.

In an exemplary embodiment of the present invention, the weight value and the threshold value may depend on the network environment. However, it is preferable that the weight value of "type 3" is greater than that of "type 2" and the weight value of "type 2" is greater than that of "type 1."

Figure 6:
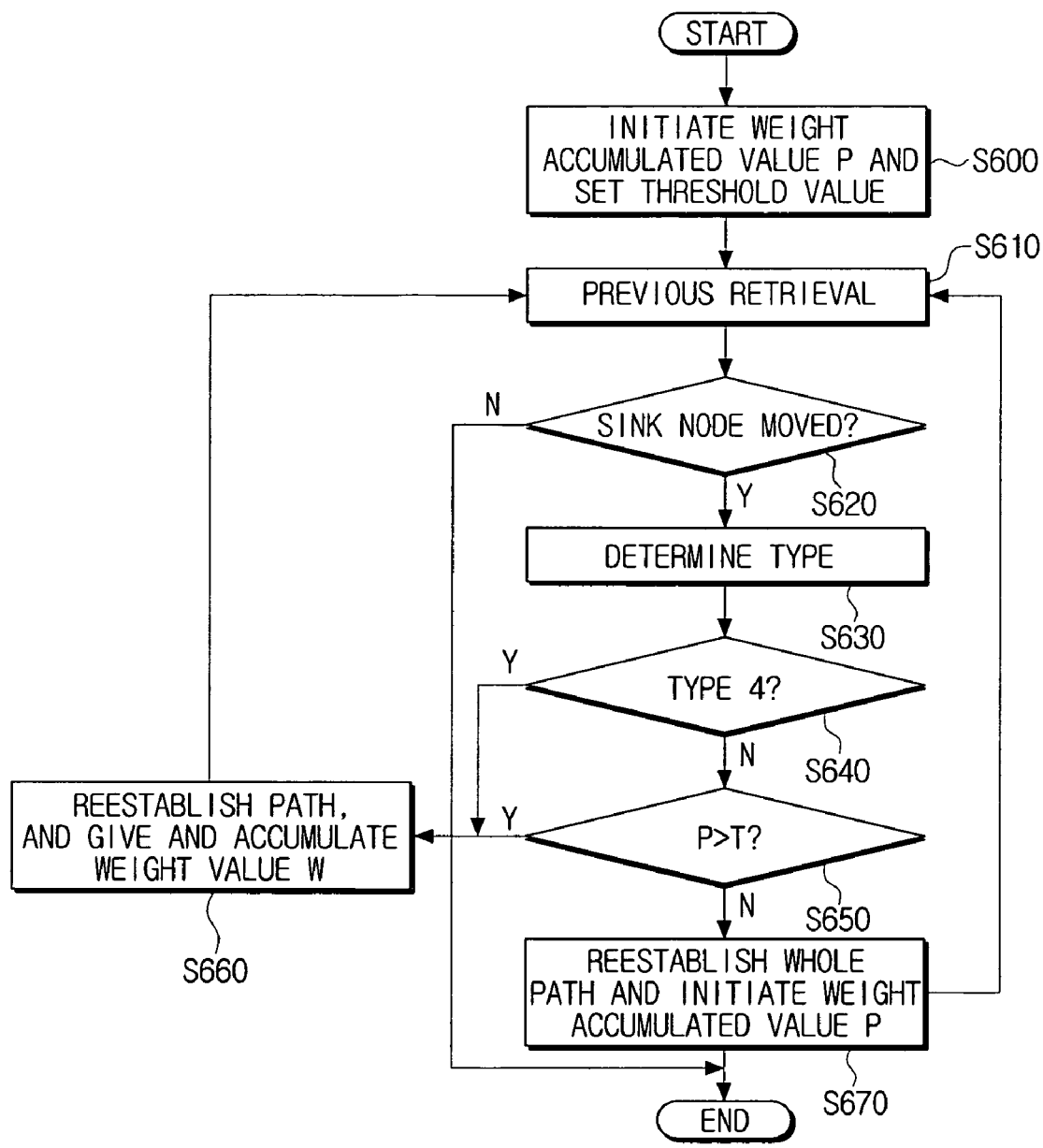
FIG. 6 is a flowchart illustrating a method for establishing a data transmission path according to the exemplary embodiment of the present invention.

FIG. 6 is a flowchart illustrating the method for establishing a data transmission path according to an exemplary embodiment of the present invention.

First, the sink node initiates the weight accumulated value and sets the threshold value T depending on the network environment (S600).

Then, the sink node requests the nodes on the data transmission path to give information on their adjacent nodes. However, in one exemplary embodiment of the present invention, the nodes on the data transmission path may transmit their adjacent node information along with data. Also, in another exemplary embodiment of the present invention, the sink node may request only the node $H_1$ within a distance of 1 hop and the node $H_2$ within a distance of 2 hops to give information on their adjacent nodes.

If only "$H_1$" and "$H_2$" are requested to give their adjacent node information, they respectively transmit their adjacent node information to the sink node and the sink node stores the adjacent node information (S610).

Afterwards, if it is determined that the sink node moves (S620), the sink node transmits a predetermined broadcasting message to adjacent nodes at the position where it has moved, and receives corresponding adjacent node information. In an exemplary embodiment of the present invention, information on sub-adjacent nodes of the adjacent nodes may also be transmitted to the sink node along with the adjacent node information. In this case, the step S610 may be skipped if the data transmission path is reestablished as the sink node moves. Meanwhile, the sink node classifies the adjacent nodes into the aforementioned types using the adjacent node information.

The type of the node to be first located from the sink node on the reestablished data transmission path is determined. To this end, the priority order is given in the order of "type 1," "type 2," and "type 3" (S630). If no adjacent node corresponding to "type 1," "type 2," or "type 3" exists among the adjacent nodes, the adjacent nodes are determined as "type 4."

If it is determined that the adjacent nodes correspond to "type 4" (S640), the whole data transmission path is reestablished and information on the existing data transmission path is not used. In this case, the weight accumulated value P is to be initiated (S670). Also, the step S610 is implemented at the position where the sink node has moved after the whole data transmission path is reestablished.

If it is determined that the adjacent nodes do not correspond to "type 4," it is identified whether the weight accumulated value P has exceeded the threshold value T set at the step S600 (S650). If it is identified that the weight accumulated value P has exceeded the threshold value T, the whole data transmission path is reestablished and information on the existing data transmission path is not used. In this case, the weight accumulated value P is to be initiated (S670). Also, the step S610 is implemented at the position where the sink node has moved after the whole data transmission path is reestablished.

However, if it is identified that the weight accumulated value P has not exceeded the threshold value T, the sink node reestablishes the data transmission path depending on the priority order of the aforementioned types, and at the same time gives the weight value depending on the types and accumulates the weight value (S660).

In case where the data transmission path is reestablished, the node to be first located from the sink node on the reestablished data transmission path is determined. Generally, the adjacent node corresponding to the type determined at the step S630 is determined as the node $H_1$ to be first located from the sink node. If plural adjacent nodes corresponding to the same type determined at the step S630 exist, one of the plural adjacent nodes is determined as "$H_1$."

If plural adjacent nodes corresponding to "type 1" exist, the adjacent node that is closest to the source node is determined as "$H_1$." However, if plural nodes having the same number of hops exist, "$H_1$" is determined depending on a random manner.

Additionally, if plural adjacent nodes corresponding to "type 2" or "type 3" exist, "$H_1$" is determined depending on a random manner.

If "$H_1$" is determined as above, the sink node receives data through the adjacent node determined as "$H_1$."

Meanwhile, in case where the weight value W is given and accumulated depending on the type of the adjacent node determined as "$H_1$," "−1" can be applied to "type 1," "+1" to "type 2," and "+2" to "type 3" depending on the network environment.

Furthermore, the step S610 is implemented at the position where the sink node has moved after the whole data transmission path is reestablished. If it is determined that the sink node has not moved at the step S620, later steps are not implemented and the procedure is ended.

As described above, in the present invention, since the data transmission path is reestablished without flooding, it is possible to reduce energy of the nodes. Also, the method for establishing a data transmission path according to the present invention can be applied to every routing protocol without additional conditions.

The foregoing embodiment and advantages are merely exemplary and are not to be construed as limiting the present invention. The present exemplary teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for establishing a data transmission path of a sink node applied to a network system that includes a plurality of nodes including the sink node, the method comprising:
   a) requesting nodes on a previously established data transmission path to give their adjacent node information;
   b) receiving the adjacent node information;
   c) retrieving information regarding adjacent nodes as the sink node moves; and
   d) reestablishing the data transmission path through a result of the retrieval result and the adjacent node information, wherein
   the step c) includes c1) broadcasting a predetermined message to the adjacent nodes, and c2) receiving information including node IDs from the adjacent nodes; and
   the step d) includes d1) selecting a first node from among the adjacent nodes on the data transmission path according to a priority order, wherein the priority order is set according to a number of hops of the reestablished data transmission path.

2. The method as claimed in claim 1, wherein the nodes on the data transmission path at the step a) are first and second nodes from the sink node.

3. The method as claimed in claim 1, further comprising storing the requested adjacent node information.

4. The method as claimed in claim 1, wherein a node having a first priority is an adjacent node closest to the sink node on the previously established data transmission path among the adjacent nodes.

5. The method as claimed in claim 4, wherein a node having a second priority is an adjacent node corresponding to a second node from the sink node among the adjacent nodes.

6. The method as claimed in claim 5, wherein a node having a third priority is an adjacent node corresponding to the first node from the sink node among the adjacent nodes.

7. The method as claimed in claim 4, wherein a predetermined weight value is accumulated depending on the priority order, and the data transmission path is wholly reestablished if the accumulated weight value exceeds a predetermined threshold value.

8. The method as claimed in claim 7, wherein the accumulated predetermined weight value is initiated if the data transmission path is wholly reestablished.

9. The method as claimed in claim 1, further comprising receiving the adjacent node information of the nodes on the reestablished data transmission path.

10. The method as claimed in claim 1, wherein the adjacent nodes are those within a distance of one hop from the nodes.

11. A network system, comprising:
   a plurality of nodes in which one of the nodes is a sink node and a data transmission path is established to the sink node; wherein,
   the sink node requests nodes on the established data transmission path to give their adjacent node information, the sink node receives the adjacent node information, the sink node retrieves information regarding adjacent nodes as the sink node moves, and the data transmission path is reestablished through a result of the retrieval result and the adjacent node information;
   the sink node retrieves the information regarding the adjacent nodes by broadcasting a predetermined message to the adjacent nodes and receiving information including node IDs from the adjacent nodes; and
   the data transmission path is reestablished by selecting a first node from among the adjacent nodes on the data transmission path according to a priority order, wherein the priority order is set according to a number of hops of the reestablished data transmission path.

12. The network system of claim 11, further comprising:
   a memory in which the requested adjacent node information is stored.

* * * * *